United States Patent [19]

Dunham

[11] Patent Number: 4,961,359
[45] Date of Patent: Oct. 9, 1990

[54] SAW GUIDE WITH GAS LUBRICATION AND GAS SEALED COOLANT CHAMBER

[76] Inventor: James L. Dunham, 216 Redwood Ave., Willits, Calif. 95490

[21] Appl. No.: 510,982

[22] Filed: Apr. 19, 1990

[51] Int. Cl.$^5$ .............................................. B27B 5/29
[52] U.S. Cl. ...................................... 83/169; 83/171; 83/821
[58] Field of Search .................. 83/168, 169, 171, 821

[56] References Cited

U.S. PATENT DOCUMENTS

| | | | |
|---|---|---|---|
| 3,623,520 | 11/1971 | Neild | 83/169 |
| 3,661,045 | 5/1972 | Mermelstein | 83/169 |
| 3,703,915 | 11/1972 | Pearson | 83/169 |
| 3,750,503 | 8/1973 | McMillan | 83/169 |
| 3,918,334 | 11/1975 | Wilcox | 83/169 |
| 3,961,548 | 6/1976 | Claassen | 83/169 |
| 4,136,590 | 1/1979 | Kordyban et al. | 83/169 |
| 4,567,798 | 2/1986 | Brdicko | 83/171 |
| 4,635,513 | 1/1987 | McGeehee | 83/169 |
| 4,715,254 | 12/1987 | DeGan | 83/169 |
| 4,848,200 | 7/1989 | McGeehee | 83/169 |

Primary Examiner—Frank T. Yost
Assistant Examiner—Scott A. Smith

[57] ABSTRACT

A saw guide system having gas lubricated bearing surfaces and liquid contact cooling of the saw blade is described. The gas lubricated bearing surfaces enclose a liquid contact coolant chamber providing a gas seal confining the liquid coolants. The use of regulated gas lubrication greatly reduces friction between the saw blade and saw guide while providing powerful centering forces which hold the saw blade precisely in position. The use of gas sealing allows the liquid coolants to be recirculated in a closed loop piping system, thus eliminating discharge to the environment while providing increased contact cooling of the saw blades.

6 Claims, 4 Drawing Sheets

SAW GUIDE WITH GAS LUBRICATION AND GAS SEALED COOLANT CHAMBER

BACKGROUND OF THE INVENTION

1. Field of the Invention

The present invention generally relates to saw guides for wood sawing which include lubricating and cooling capabilities.

2. Description of Prior Art

Multiple blade saw systems are widely used throughout the lumber industry. Most multiple blade saw systems use very thin circular saw blades. Thin saw blades use less power and provide higher yield. However, thin saw blades require saw guide systems to stabilize the blades during cutting and prevent buckling. Typically this is done by sandwiching each blade between two flat lubricated surfaces which act as bearings supporting the blade. These bearing surfaces usually consist of a low friction material supported by a metal block adjacent the cutting zone. Many existing guiding systems use babbitt saw guides which provide a soft bearing surface that wears in. Other systems use bearing surfaces made of hard materials which are wear resistant.

Saw guide systems normally include a means of lubricating and cooling both the saw guides and saw blades. Typically the liquid lubricants are carried into the narrow space between saw guide and saw blade in the form of a mist created by forcing high pressure air through a venturi nozzle or the like. Other systems apply liquid lubricants and coolants directly into the space. Some systems are provided with dual sets of passages in each saw guide to provide both air oil and air water mists.

Normally all water and oil provided for lubrication and cooling to the saw guides is lost into the sawing environment, soaking into the sawdust, onto the lumber products, or draining away. In order to conserve water and oil sequencing systems are utilized which vary the application rates of the water and oil so as to provide the minimum required during the sawing process.

Additional cooling is sometimes provided by water deluge systems which spray water onto the saw blades and guides.

A problem with saw guide systems in general is the wear of bearing surfaces. Guides require frequent changing. Typically babbitt shifting saw guides last only a hundred hours.

It would be desireable to have a guide system which is very effective in holding the blade in the center position between the bearing surfaces. This would reduce bearing wear and extend the useful lives of the saw guides, thus reducing cost associated with frequent changes. An effective guide system also allows the use of thinner kerf saw blades which increases yield directly.

A problem with saw systems in general is the heating of saw blade and adjacent bearing surfaces. The heating causes dimensional instabilities which contribute to wear. It would be very desireable to increase cooling of the bearing surfaces and saw blades. This could substantially reduce wear and extend the useful lives of the saw guides, thus reducing cost associated with frequent changes. Sufficiently increased cooling would also eliminate the need for using deluge systems.

It is also desireable to recover and recycle liquid coolants. This is advantageous for limiting discharge into the environment. For example, a recirculating cooling system would be very desireable. It could allow greater application of coolants to the guide bearing surfaces without increasing coolant loss into the environment. Such a closed loop cooling system could greatly reduce water use.

SUMMARY OF THE INVENTION, OBJECTS, AND ADVANTAGES

The present invention provides an improved system and method for supporting, cooling, and lubricating circular saws in multiple saw assemblies. The system uses individual saw guides, each of which includes one or more bearing surfaces intended to be placed adjacent the flat face of a saw blade. Two such guides placed on opposite faces of saw blade together form a guide channel which supports and guides the rotating saw blade.

The present invention is based on providing an improved sawguide with a bearing surface that uses gas lubricants and also has direct liquid contact cooling of the saw blade.

The present invention has a perimeter bearing surface consisting of individual regions comprising a regulated gas bearing surface. The gas bearing surface encloses a contact liquid cooling chamber. In operation the gas bearing acts as a seal for containing liquid lubricants in the chamber. Fluids which are in the cooling chamber are in direct contact with the adjacent saw blades. The cooling chamber is connected by supply and return passages in the sawguide to a piping system.

The present invention includes a piping system for circulating, cooling, filtering, and degassing the liquid coolants. The liquid coolants are circulated to the bearing surface cooling chamber through a network of passages interior to the saw guide system. A similar system of passages returns the fluid from the bearing surface through a closed loop system. A control system regulates pressures and flow rates.

The gas bearing surface of the present invention is comprised of several individual adjacent gas bearing surfaces. The individual surfaces are elongated nearly rectangular sections. Each section has a groove near the center line of the major axis which supplies gas. The path length from the groove to the exterior edge of the bearing surface is nearly the same for all points on the edge and thus ensures even flow and support at the edge.

The gas lubricants enter each groove through a precisely machined orifice passage at the center of the groove. With an adequate supply of high pressure gas the orifice passage regulates the flow by creating a standing shock wave in the orifice and also at the exterior edge of the bearing surface, and hence the term sonic regulation. Flows which are sonic regulated tend to remain uniform for a wide range of bearing pressures. This in turn results in a stiff bearing, or in other words a bearing with a strong tendency to hold the blade in the center position between the two opposing saw guide bearing surfaces.

The gas, usually filtered and lubricated compressed air is routed to the bearing surface through passages in the saw guide and the guide support system. The supply air pressure is regulated.

The grooves in the bearing surface are maintained at a positive pressure relative to the interior cooling chamber. Thus, the pressurized perimeter bearing surface functions as a gas seal. It prevents liquid lubricants from escaping the cooling chamber by sealing the edge with gas.

Some art prior systems use the air as a vehicle to carry liquid lubricants to the bearing surfaces by creating a mist. The value of gas lubricated bearing surfaces in supporting the saw blade is not generally recognized. However, Dunham, "Sawguide with Sonic Regulated Gas Bearing", application #07/500399, dated 28 March 1990, recognizes the value of gas lubrication, but does not include liquid cooling.

Prior art systems commonly use water and oil liquid lubricants. Generally prior art systems do not recover and recycle liquid lubricants. However, Dunham, "Sawguide with gas sealed Bearing Surface", application dated 12 April 1990, recovers and recycles saw guide liquid lubricants and coolants, but does not combine individual gas bearing surfaces with a cooling chamber.

The present invention combines the substantially increased saw guide cooling capabilities of the contact cooling chamber with the outstanding centering properties of the gas lubricated bearing surface.

The present invention substantially reduces water requirements of the sawing process by recycling cooling water in a closed loop system.

DESCRIPTION OF THE PREFERRED EMBODIMENT

Figure 1:
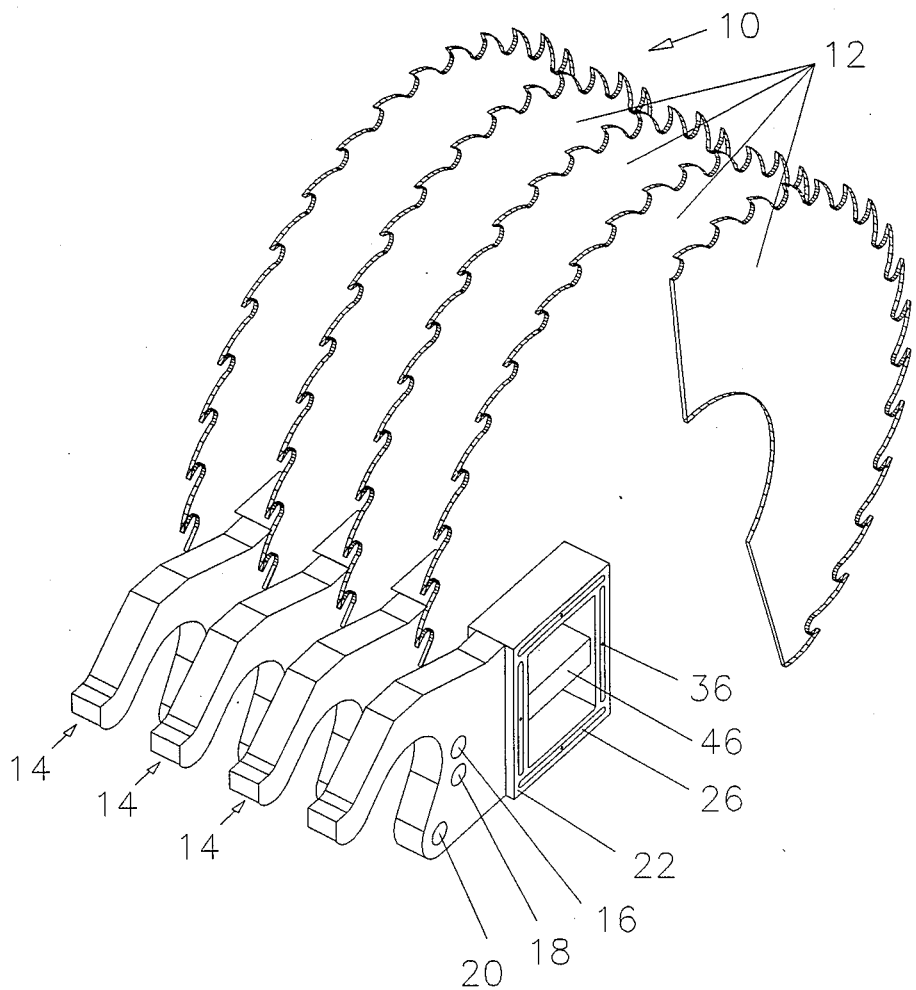
FIG. 1 is an isometric view of a multiple saw blade assembly which uses the present invention. The saw guides are spaced apart for clarity.

Referring to FIG. 1, a multiple circular saw assembly (10) includes several saw blades (12) which rest on a common arbor drive shaft (not shown). The blades (12) are driven in rotation by the arbor.

The saw blades (12) which are spaced apart axially on the drive shaft and are parallel to each other, make parallel cuts in the lumber being sawed. Individual saw guides (14) are located between the adjacent saw blades (12) with bearing surface (22) lying immediately adjacent the face of each saw blade (12). Typically the clearances between the saw guide (14) bearing surface (22) and the saw blade (12) will be from 0.001 to 0.004 inches. The bearing surface (22) is usually made of a low friction material which reduces the drag on the rotating saw blades (12).

Figure 2:
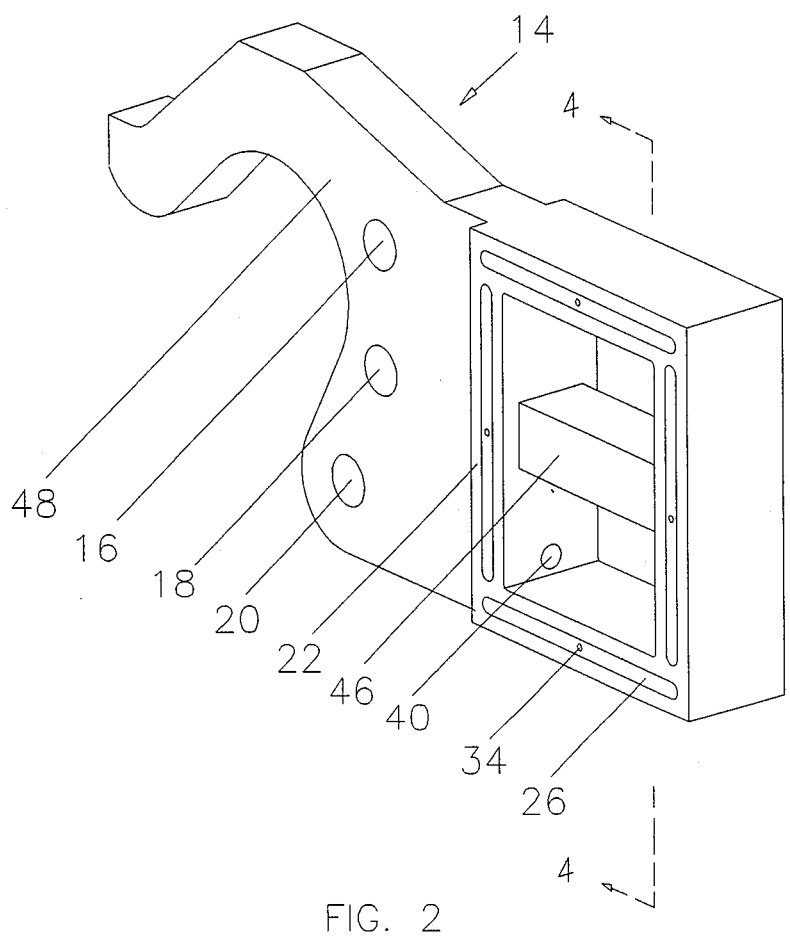
FIG. 2 is an isometric view of a saw guide of the present invention.

Referring now to FIG. 2, the saw guides (14) mount on a guide support rod (not shown) by a U-shaped bracket (48).

Up to this point the description the construction of the saw guide system has been conventional. The present invention comprises an improvement to the system, specifically comprising a bearing surface (22) configured for gas lubricants which encloses a liquid contact coolant chamber (54).

Each saw guide (14) is usually a steel block machined to specified external dimensions. Raised bearing surfaces (22) are typically formed by casting bearing material onto the inner steel structural member. Bearing surfaces (22) are provided on both sides of the guide blocks except for the end saw guides which have a bearing surfaces on one side only. There are a variety materials which are suitable as bearing surfaces. Molded bearing surfaces can be recast and machined when they become worn to restore tolerances. Some bearings use mechanical attachment instead of casting.

Each bearing surface (22) has a encloses a large rectangular region which forms the interior edge (52) of the bearing surface (22). Adjacent to the interior edge (52) and perpendicular to the bearing surface (22) is an rectangular opening through the saw guide block which is the cooling chamber (54). A rectangular beam (46) traverses the cooling chamber (54) connecting to opposite walls of the cooling chamber (54).

Each bearing surface (22) is comprised of four similar regions, two vertical and two horizontal which enclose the cooling chamber (54).

Figure 3:
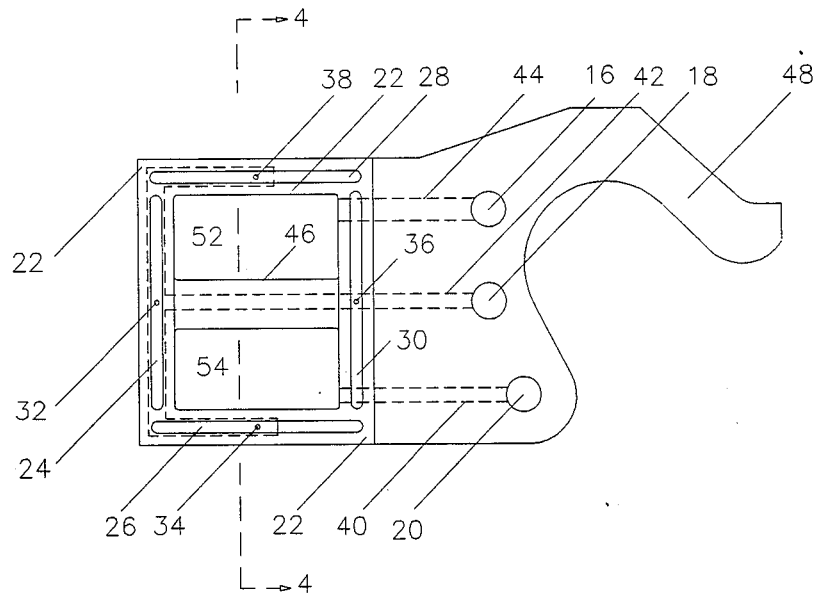
FIG. 3 is a front elevation view of the saw guide of the present invention with interior distribution passages indicated.
Figure 4:
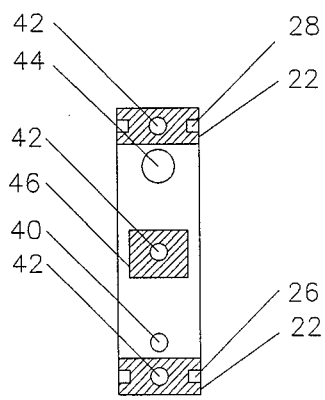
FIG. 4 is a sectional view of a saw guide of the present invention clarifying internal passages and grooves.

Referring now to FIG. 3, each the four regions of the bearing surface has a groove (24,26,28,30) in the surface. Each groove is connected to the gas inlet port (18) by a series of certain internal passages as will be described in detail below. The groove (24,26,28,30) is approximately $\frac{1}{4}''$ inch wide, although this size may vary within the design. The length of the groove (24,26,28,30) is such that the distance from the edges at the ends of adjacent grooves is about $\frac{1}{4}''$.

The location and length of the grooves (24,26,28,30), in conjunction with rectangular shape of the adjacent bearing surface (22), provides for an approximately equal distance between the edge of each groove (24,26,28,30) and the edges of the bearing surface (22). This configuration ensures a relatively uniform flow path length across the bearing surface (22). Thus, the pressurization of the grooves will result in a symmetrical and fairly uniform flow across the bearing surface from the grooves (24,26,28,30) outward towards the exterior edge of the bearing surface (22).

At the center of each groove (24,26,28,30) a precisely machined transverse passage (32,34,36,38) connects the bottom of the grooves (24,26,28,30) on both sides of the saw guide (14) to the interior passage (42). The interior passage (42) in turn connects to the transverse passage (18) which is the gas inlet port. The cross sectional area of the port (20) and the longitudinal passage (42) are in general much larger than the cross sectional area of the transverse passages (32,34,36,38) connecting to the grooves (24,26,28,30).

The bearing surface (22) comprises a means for distributing gas evenly to the exterior of the bearing surface (22) and sealing the interior of the bearing surface (22) so as to prevent the escape of liquid coolant from the cooling chamber.

The cooling chamber (54) connects to two longitudinal interior passages (44,40). The bottom longitudinal passage (40) connects to the transverse passage (20) which is the liquid coolant inlet port. The upper longitudinal passage (44) which connects to the transverse passage (16) which is the liquid coolant return port.

It will be appreciated that while the preferred embodiment of the present invention provides a network of passages and opening for conveying gas and fluids to and from the bearing surfaces, the present invention includes distribution passages and openings which have a different routing and location.

It will be appreciated that while the preferred embodiment of the present invention provides a common network of passages for conveying gas to the various grooves in the bearing surfaces, the present invention may also include separate distribution passages within the saw guide which can supply gases of different compositions and or of different pressures to the individual bearing surfaces.

It will be appreciated the while the preferred embodiment of the present invention incorporates a open cooling chamber open to both sides of the saw guide it also includes chambers which are individually open to only one side. Additionally, the present invention includes the obvious varieties of chamber geometric forms which comprise a means of providing surface contact cooling.

It will be appreciated the while the preferred embodiment of the present invention incorporates a gas seal using an air oil mist, the present invention may also include other gases, or dry air, or air water mists.

Additionally, it will be appreciated that while the preferred embodiment of the present invention has four adjacent bearing surface regions per side, the present invention may also include one, two, three, or more such regions per side. Several such combinations are obvious.

Figure 5:
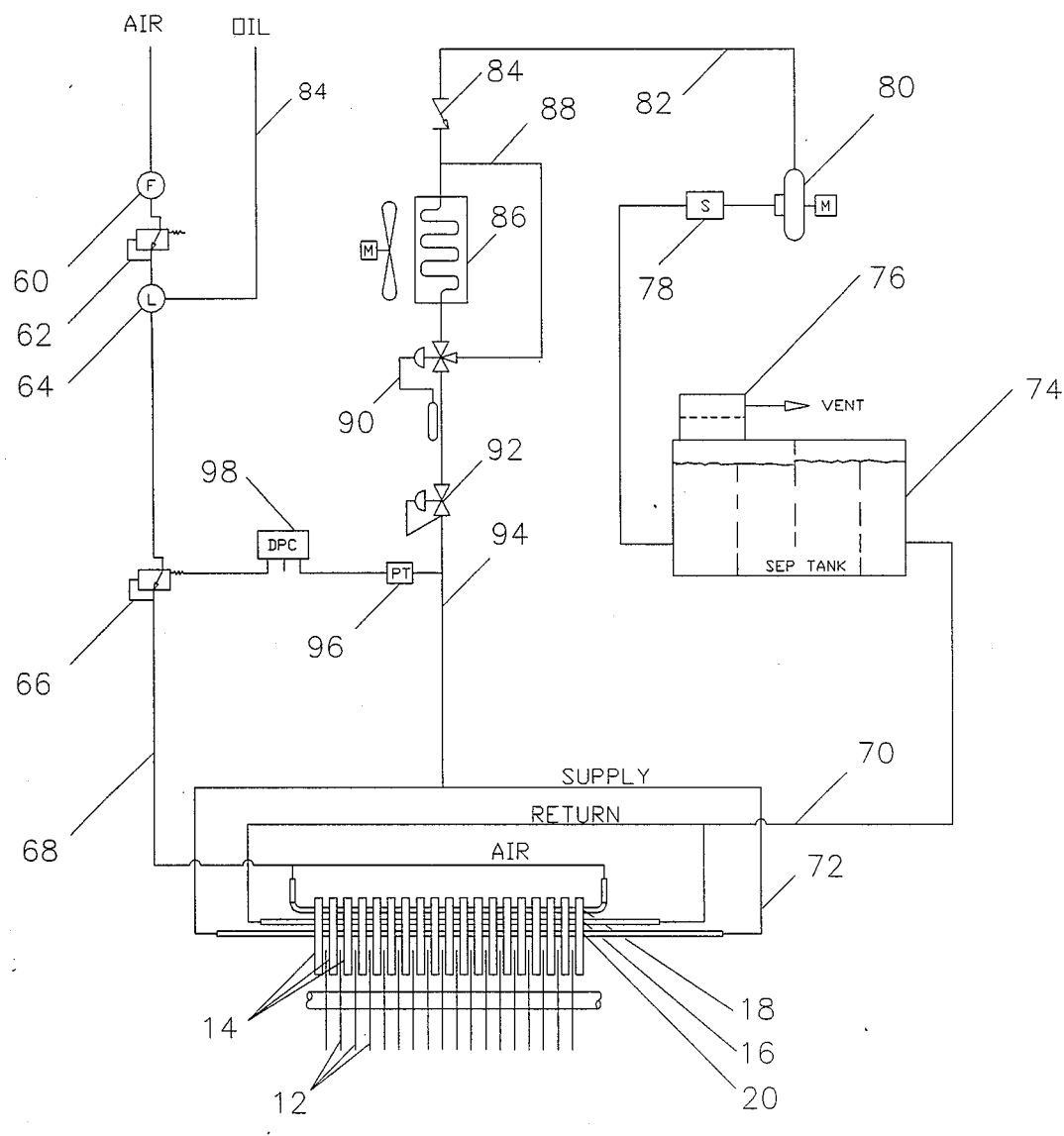
FIG. 5 is a schematic diagram of a the gas lubrication and liquid cooling piping system.

Referring to FIG. 5., a schematic diagram of the system that supplies gas, lubricants, and coolants to the individual saw guides is shown. A source of pressurized gas, usually dry compressed air, is connected through a filter (60), pressure regulator (62), a lubricator (64), a differential pressure control valve (66) to the air piping manifold (68). Oil is supplied to the lubricator (64) via piping (not shown) from a reservoir (not shown) by a oil pump (not shown). The manifold piping (68) connects to the manifolded inlet gas ports (18) of the individual saw guides (14).

The piping system that circulates coolant to and from the sawguide (14) is connected to the manifolded saw guide return ports (16), through the return piping manifold (70), to a air separation tank (74) to a strainer (78), and to the inlet of a circulating pump (80). The discharge of the circulating pump (80) connects to the check valve (84), to the heat exchanger (86) and to the heat exchanger bypass piping (88). Both the bypass piping (88) and the heat exchanger (86) connect to the temperature control valve (90), to a pressure regulating valve (92), to the supply piping manifold (94), to the manifolded liquid coolant supply ports (20) of the saw guide (14) completing the circuit.

A make up source (not shown) for the liquid lubricant and coolant, which is usually a treated water mixture, is connects into the air separation tank (74).

A pressure transducer (96) sensor is connected to the supply system piping (94) between the pressure regulating valve (92) and the saw guide supply port (20). The output of the pressure transducer (96) connects to the differential pressure controller (98) which connects to the differential pressure control valve (66).

Referring now to FIG. 5 and FIG. 3, in operation a source of high pressure gas, usually filtered (60) lubricated (62) compressed air at a regulated (64) pressure is routed through a differential pressure control valve (66) which is controlled (80) so as to main a constant differential pressure between the air seal supply piping manifold (68) and the coolant and lubricant supply manifold (94).

The gas is then routed to inlet ports (18) of the individual saw guides (14) and then through the internal passage (42) to the transverse orifice passages (32,34,36,38) and then into the groove (24,26,28,30) in the bearing surface (22). There is a pressure loss, mostly in the differential pressure control valve (66), in transferring the gases to just upstream of the orifice passage (32,34,36,38). The pressure drop through the orifice passage is about half the remaining pressure. The gas escapes from the groove (24,26,28,30) across the bearing surface (22). A pressure loss induced by flow friction in the narrow space, typically a 0.001 inch gap between the saw blade and bearing surface, will reduce the pressure to a few psi above atmospheric near the edge.

The differential pressure between the air supply manifold (68) and the liquid supply manifold (94) is adjusted so as to maintain a static boundary surface between the air and liquid at the edge of the interior bearing surface (62) thus containing the liquid in the cooling chamber (54).

The transverse passages (32,34,36,38,) the grooves (24,26,28,30) and the bearing surface (22) act together as a sonic regulated gas bearings which tend to hold the saw blade in the center position between the saw guides (14). Air bearings produce large centering forces with small changes in clearances and are consequently very effective in maintaining a saw blade in position.

In operation, the circulating pump (80) to supplies liquid coolant to and from the cooling chamber (54). A heat exchanger (86) on the discharge side of the pump (60) operates to remove heat from the coolant. A temperature control valve (90) varies the flow between the bypass piping (88) and the heat exchanger (86) regulating the temperature of the coolant. A pressure regulating valve (92) maintains a constant pressure and relatively uniform flow of liquids to the supply ports (20) of the saw guides (14). The liquid coolant flows through the interior passage (40) into the bottom of the cooling chamber (54). The liquid pressure in the cooling chamber (54) is slightly lower than the average air pressure in the perimeter grooves (32,34,36,38). Thus some gas intrudes into the cooling chamber (54) that is later removed in the separation tank (74).

In operation, the liquid in the cooling chamber contacts and cools the adjacent saw blade and saw guide. The friction with rotating saw blade agitates the liquid increasing effective cooling. The coolant is returned the through interior passage (44), to the return port (16) of the saw guide (14), and then in the return piping (70) through an air separator (74), which removes any gas that may have intruded into the system, then back to the inlet of the pump (60) completing the cycle.

A number of standard components common to any such the piping system, such as pressure gages, thermometers, manual valves, drain, and bleed connections, etc. have been omitted for clarity.

It will be appreciated that while the preferred embodiment provides a system supplying gas and circulating coolants the present invention includes the many variants to this piping system which cool, degas, filter, and circulate the coolants.

In practice the pressures and flows vary somewhat as all systems are designed for somewhat different conditions and operators have their own preferences for adjustments within any system. Additionally flow and pressures across the bearing surfaces (22) vary with the changes in the clearance between the saw blade and the bearing surface.

However, the important aspects of the proper operation include adjusting the pressure in the liquid and gas sections to contain the liquids in the cooling chamber (54) without excessive gas intrusion into the liquid system, and adjusting the gas supply system to obtain the desired flow and pressure to the gas bearing surfaces (22).

With regards to gas bearings, the important aspects of the proper operation include a substantial pressure drop across the orifice passage (32,34,36,38) and at the exterior edge of the bearing surface (22) so as to regulate flow, and a relatively high speed uniform average gas velocity across the bearing surface relative to the saw tip speed in order to promote quick response.

Regulation increases the magnitude of the bearing restoring force gradient which acts to hold the saw blade (12) in position by causing the pressure in the groove (24,26,28,30) to vary substantially with a change in the magnitude of the clearance between the bearing surface (22) and the saw blade (12).

A pressure drop at the exterior edge of the bearing surface (22) prevents the bottoming out the bearing pressure in the adjacent interior regions at atmospheric pressure when the clearance increases. This enhances support near the edge of the bearing which important in resisting saw tilt.

Quick response time of restoring forces is characteristic of a dynamically stable system. High speed gas velocities result in rapid flow pattern adjustments lowering lag time in the response of the local bearing pressure to a change in saw blade position. With saw tip speeds on the order of 10,000 feet per minute then gas bearing velocities five times faster would be on the order or 50,000 ft per minute which is in upper sub sonic range of compressible air flow at room temperatures.

Additionally, the physical geometry of the rectangular bearing surface and the groove comprise a means of keeping expansion of the gases due to area change effects at a minimum. This is important in order to maintain subsonic flow across the bearing surface rising to sonic at the edge under the nominal design conditions. For example, when the geometry of the bearing surface is circular with a circular supply recess at the center then the flow area changes in proportion to the ratio of the radial distance divided by the recess diameter. This produces flow patterns which are area change dominated even when the recess diameter is half the bearing surface diameter. When area change effects are minimized the flow can become friction dominated, or in technical terms, Fanno line flow. This is the desired condition which allows the gas to enter the bearing surface at a subsonic velocity and rise gradually in velocity across the surface to sonic velocity at the exterior edge.

The brief physical explanation given above is believed to be accurate. However, it should not be construed as binding or complete as the physics of compressible flow with dynamic boundaries is quite complex.

Although the foregoing invention has been described in some detail with illustrations and examples for clarity, it will be obvious that certain changes and modifications may be practiced within the scope of the appended claims.

What is claimed is:

1. An improved saw guide system for use in supporting multiple saw assemblies which includes a saw guide between each adjacent saw blade and on the outside of each end blade, said improvement comprising said saw guides having a coolant chamber enclosed in a bearing surface adjacent each saw blade surface including a means integral to each saw guide for supplying and recovering liquid coolants to said cooling chamber, said coolants in said chamber directly contacting said saw blade.

2. An improved saw guide system as in claim 1, wherein there are two separate networks of internal passages and openings to the coolant chamber, one said network comprising a means of supplying liquids to said chamber, and the other said network comprising a means of collecting and returning said liquids from said chamber.

3. An improved saw guide system as in claim 1 which includes an external system for cooling, filtering, and degassing the liquid coolants.

4. An improved saw guide system as in claim 1 characterized by a closed loop piping system including a heat exchanger, an air separation tank, a strainer, a pump, an expansion tank, a source of make up fluids, and a pressure controller.

5. An improved saw guide system for use in supporting multiple saw assemblies which includes a saw guide between each adjacent saw blade and on the outside of each end blade, said improvement comprising said saw guides having a regulated gas lubricated bearing surface adjacent each saw blade surface enclosing a liquid coolant chamber, including a means integral to each saw guide for directing lubricating gases between the saw guide bearing surface and the adjacent saw blade in order to reduce friction between and heat generated by said saw blade and said saw guides said gases and said bearing surface containing liquid coolants in said cooling chamber and preventing said liquids from escaping into the sawing environment.

6. An improved saw guide system as in claim 5 wherein the bearing surface has a perimeter groove which encloses said liquid coolant chamber, said groove distributing said gases evenly to the edge bearing surface.

* * * * *